US008245038B2

(12) United States Patent
Golle et al.

(10) Patent No.: US 8,245,038 B2
(45) Date of Patent: Aug. 14, 2012

(54) METHOD AND APPARATUS FOR VERIFYING INTEGRITY OF REDACTED DOCUMENTS

(75) Inventors: Philippe Jean-Paul Golle, San Francisco, CA (US); Jessica N. Staddon, Redwood City, CA (US); Richard Chow, Sunnyvale, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1176 days.

(21) Appl. No.: 12/055,870

(22) Filed: Mar. 26, 2008

(65) Prior Publication Data

US 2009/0249220 A1 Oct. 1, 2009

(51) Int. Cl.
*H04L 29/06* (2006.01)
(52) U.S. Cl. ...................... 713/168; 713/179
(58) Field of Classification Search .................. 713/168, 713/179
See application file for complete search history.

(56) References Cited

FOREIGN PATENT DOCUMENTS

EP 1498799 A2 1/2005

OTHER PUBLICATIONS

Steinfeld, Ron; Bull, Laurence; Zheng, Yuliang, "Content Extraction Signature", "Information Security and Cryptology"—ICISC 2001, Lecture Notes in Computer Science, 2002, pp. 285-304.*
Haber, S., Horne, W., Sander, T., Yao, D.: Privacy-preserving verification of aggregate queries on outsourced databases. Technical report, Trusted Systems Laboratory, HP Laboratories Palo Alto, Nov. 2006.*
Steinfeld, Ron et al., "Content Extraction Signatures", Lecture notes in computer science, Springer, De, vol. 2288, Dec. 6, 2001, pp. 285-304.
Johnson, Robert et al., "Homomorphic Signature Schemes", vol. 2271, 2002, pp. 244-262, Proceedings of the Cryptographer's Track at the RSA Conference on Topics in Cryptology.

* cited by examiner

*Primary Examiner* — Kim Vu
*Assistant Examiner* — Yogesh Paliwal
(74) *Attorney, Agent, or Firm* — Shun Yao; Park, Vaughan, Fleming & Dowler LLP (57) ABSTRACT

One embodiment of the present invention provides a system which allows a document owner to redact content from a document and allows a recipient of the redacted document to challenge the appropriateness of the redaction. During operation, the system allows the document owner to redact a string $M_i$ from location i in the document. In doing so, the system produces a commitment $C_i = C(M_i, R_i)$ based on string $M_i$ and a string $R_i$ used as randomness and communicates $C_i$ to the recipient. When the recipient challenges the redaction, the system receives a topic string T from the recipient, and produces a string $R_T$. The system then communicates $R_T$ to the recipient, thereby allowing the recipient to produce a commitment $C_T = C(T, R_T)$ based on strings T and $R_T$, and compare $C_T$ with $C_i$. Comparing commitment $C_T$ with $C_i$ allows the recipient to test redactions for string equality.

24 Claims, 8 Drawing Sheets

METHOD AND APPARATUS FOR VERIFYING INTEGRITY OF REDACTED DOCUMENTS

BACKGROUND

1. Field of the Invention

The present invention relates to techniques for redacting sensitive information from a document. More specifically, the present invention relates to a method and apparatus for allowing a document owner to redact content from a document and allowing a recipient of the document to verify the integrity of the redacted document by challenging the redacted and/or unredacted text regions.

2. Related Art

Identifying sensitive information in a document and redacting this information from the document can be an arduous task. The redaction process becomes even more complicated after the redactions are accomplished, because the document owner then needs to convince the document recipient that the document has been redacted appropriately. The recipient needs to verify that the redacted content is not required information, and that the unredacted content has not been tampered with. This is particularly common in litigation, where the post-production phase typically involves many interactions among the opposing parties and the judge to determine that no information has been inappropriately redacted. Similarly, in the healthcare industry, there is no technology standard in place to support medical record holders who need to prove they have complied correctly with HIPAA and other privacy legislation when redacting records. Unfortunately, the document owner cannot produce the original unredacted document for the recipient to analyze due to privacy issues.

SUMMARY

One embodiment of the present invention provides a system which allows a document owner to redact content from a document and allows a recipient of the redacted document to challenge the appropriateness of the redaction. During operation, the system allows the document owner to redact a string $M_i$ from a text location i in the document. In doing so, the system produces a string $R_i$ from string $M_i$ by applying a trapdoor one-way function in the reverse direction, $f_K^{-1}$, based on a secret key K, wherein the input to the trapdoor one-way function in the reverse direction is at least based on $M_i$. The system produces a commitment $C_i=C(M_i, R_i)$ for string $M_i$ using string $R_i$ as randomness and communicates the commitment $C_i$ to the recipient. When a recipient of the redacted document challenges the appropriateness of the redaction, the system first receives a topic string T from the recipient, and produces a string $R_T$ from string T by applying the trapdoor one-way function in the reverse direction, $f_K^{-1}$, based on the secret key K, wherein the input to the trapdoor one-way function in the reverse direction is at least based on T. The system then communicates string $R_T$ to the recipient, thereby allowing the recipient to produce a commitment $C_T=C(T, R_T)$ for topic string T using string $R_T$ as randomness and compare commitment $C_T$ with $C_i$. Comparing commitment $C_T$ with $C_i$ allows the recipient to test redacted portions of the document for string equality.

In some embodiments, the system further allows the recipient to verify that the received string $R_T$ corresponds to string T by applying the trapdoor one-way function in the forward direction, $f_{K'}$, to string T based on a public key K' that corresponds to the private key K, wherein $T=f_{K'}(R_T)$.

In some embodiments the system modifies the string $M_i$ before computing the string $R_i$ and before computing the commitment $C_i$ so the string $M_i$ is unique from other strings in the document.

In some embodiments, the system concatenates $M_i$ with the value i when modifying the string $M_i$ to produce $R_i=f_K^{-1}(M_i\|i)$ and to produce $C_i=C(M_i\|i, R_i)$.

In some embodiments, the system produces a value derived from string $M_i$ when modifying the string $M_i$.

In some embodiments, the system produces a commitment $C_j=C(N_j, R_j)$ for an unredacted string $N_j$ at a text location j in the document. The system produces the commitment $C_j$ for string $N_j$ using a string $R_j$. The system produces the string $R_j$ from the string $N_j$ by applying the trapdoor one-way function in the reverse direction, $f_K^{-1}$, to string $N_j$ based on the secret key K, wherein $R_j=f_K^{-1}(N_j)$. The system then communicates commitment $C_j$ and string $N_j$ to the recipient. When a recipient of the redacted document challenges the integrity of a string $N_j$, the system first receives a challenge for the integrity of string $N_j$ in the redacted document from the recipient and communicates string $R_j$ to the recipient as a response to the challenge. By communicating string $R_j$ to the recipient, the system allows the recipient to produce a commitment $C_j'=C(N_j, R_j)$ for string $N_j$ using string $R_j$ as randomness and compare commitment $C_j'$ with $C_j$. Comparing commitment $C_j'$ with $C_j$ allows the recipient to determine whether string $N_j$ has been tampered with.

In some embodiments, the recipient verifies that the received string $R_j$ corresponds to string $N_j$ by applying the trapdoor one-way function in the forward direction, $f_{K'}$, to string $R_j$ based on the public key K' that corresponds to the private key K, wherein $N_j=f_{K'}(R_j)$.

In some embodiments, the system uses a Merkle hash tree to compress a plurality of commitments into a single commitment when communicating the commitment to the recipient.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Overview

It is common practice in a number of industries for a document owner to redact sensitive information from a document before making the document publicly available. Under simple situations, which include when a document owner is volunteering to release a privileged document, the document owner can simply modify the document by omitting and altering the sensitive information.

Under special situations, however, a document owner is required to provide a privileged document to a receiving party without modifying the content of the document. The document owner is, however, allowed to redact information from the document for as long as the redacted content does not include information that the receiving party is requesting. It is unreasonable to expect the receiving party to trust that a document owner has appropriately redacted the document and to not challenge the integrity of the redacted document (e.g., challenge that the document owner has not altered the content and has not redacted information that needs to be made available to the recipient). Current practice requires a trusted third party to compare the original document with the redacted document to ensure the document has been appropriately redacted. This is especially common during litigation, where the post-production phase typically involves many interactions among the opposing parties and the judge to determine that no information has been inappropriately redacted.

Embodiments of the present invention provide a system which allows a document owner to redact a number of text strings from a document in a way which allows a recipient of the redacted document to challenge the appropriateness of the redaction. This system generates a commitment for a corresponding redacted text string, wherein this commitment allows the recipient to challenge the appropriateness of the redaction. In one embodiment, a commitment is a set of bits generated from a string and provides three qualities: binding, hiding, and testable. A commitment is binding because there is a one-to-one correspondence between the commitment and the redacted string. A commitment is hiding because a recipient cannot recover the redacted string from the commitment. A commitment is testable because the recipient can use the commitment to test a redacted string to ensure that it does not correspond to information that cannot be redacted. In one embodiment, these three properties of a commitment, namely binding, hiding, and testable, ensure that the recipient can reliably challenge the redaction while the content of the redaction remains unrevealed.

Note that, conventionally, a document owner only produces a redacted document without producing commitments. Consequently, there is no way for the recipient to challenge the appropriateness of the redacted strings without the help of an impartial third party. In embodiments of the present invention, the document owner can allow the recipient to challenge the redacted strings and affirm that these redacted strings do not pertain to certain topic words of interest based on the commitments. Also, in embodiments of the present invention, the system combines a number of commitments corresponding to multiple redacted strings into a single commitment in the form of a Merkle hash tree before communicating the commitments to the recipient.

Some embodiments of the present invention provide a system which allows a recipient of the redacted document to verify the integrity of an unredacted text string in the redacted document. This system provides the recipient with a commitment from the original document corresponding to the unredacted text string being challenged. This commitment allows the recipient to verify that the unredacted text string has not been altered by comparing the commitment with a second commitment generated from the corresponding text string of the redacted document.

Under the special situations where a document owner is required to provide a collection of privileged documents to a receiving party without modifying the content of these documents, the document owner ideally should not be allowed enough time to tamper with the required documents. Embodiments of the present invention provide a system which automatically creates commitments for a collection of documents. This system allows a document owner to provide commitments to a large collection of documents in a short period of time. As a result, this system makes it reasonable for a recipient of this document collection to demand commitments to the required documents in a period of time that is short enough to not allow the document owner to tamper with these documents (i.e., the same day). Once the commitments are published for a collection of documents, the document owner can no longer tamper with the documents while redacting information from these documents.

Document Redaction Verification System

Figure 1:
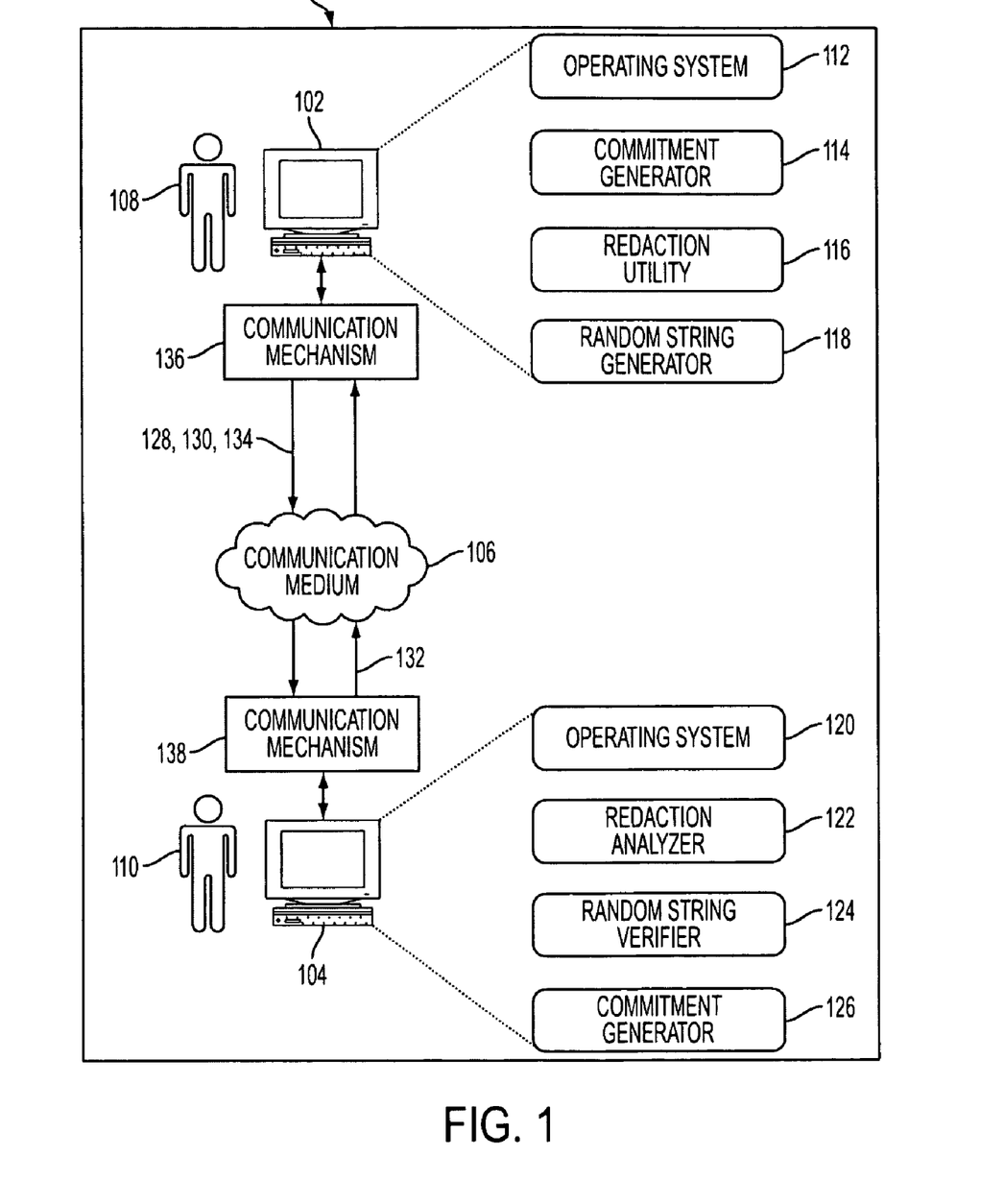
FIG. 1 illustrates a document redaction verification system in accordance with an embodiment of the present invention.

FIG. 1 illustrates a document redaction verification system 100 in accordance with an embodiment of the present invention. Document redaction verification system 100 includes a workstation 102, a workstation 104, and a communication medium 106. Communication medium 106 can include any type of wired or wireless communication channel. In one embodiment of the present invention, communication medium 106 includes the Internet.

Workstation 102 can include any node with computational capability and a communication mechanism 136 for communicating with workstation 104 through communication medium 106. In one embodiment, workstation 102 includes an operating system 112, a commitment generator 114, a redaction utility 116, and a string generator 118. Redaction utility 116 allows a document owner 108 to select text regions in the document to redact, and generates a redacted document 130. Commitment generator 114 then produces cryptographic commitments 128 for the redacted regions. Workstation 102 then communicates redacted document 130 and commitments 128 to workstation 104 through communication medium 106. When workstation 102 receives a challenge 132 from workstation 104, which challenges the integrity of redacted document 130, string generator 118 produces string 134 and workstation 102 responds to challenge 132 by communicating string 134 to workstation 104 through communication medium 106.

Workstation 104 can include any node with computational capability and a communication mechanism 138 for communicating with workstation 102 through communication medium 106. In one embodiment, workstation 104 includes an operating system 120, a redaction analyzer 122, a string verifier 124, and a commitment generator 126. Workstation 104 first receives commitments 128 and redacted document 130 from workstation 102 through communication medium 106. Redaction analyzer 122 allows a recipient 110 to challenge the integrity of a text region in redacted document 130, and generates challenge 132 based on a topic string. When challenging the integrity of a text region, workstation 104 communicates challenge 132 to workstation 102 through communication medium 106. Then, workstation 104 receives string 134 from workstation 102 corresponding to challenge 132. After string verifier 124 verifies the integrity of string 134, commitment generator 126 produces locally a commitment for the topic string and compares the produced commitment with commitments 128 to determine whether the redacted text region contains the topic word.

Document owner 108 and recipient 110 can be an individual, a group of individuals, an organization, a group of organizations, a computing system, a group of computing systems, or any other entity that can interact with document redaction verification system 100.

Note that different embodiments of the present invention may use different configurations, and are not limited to the configuration illustrated in document redaction verification system 100.

Document Owner

Figure 2:
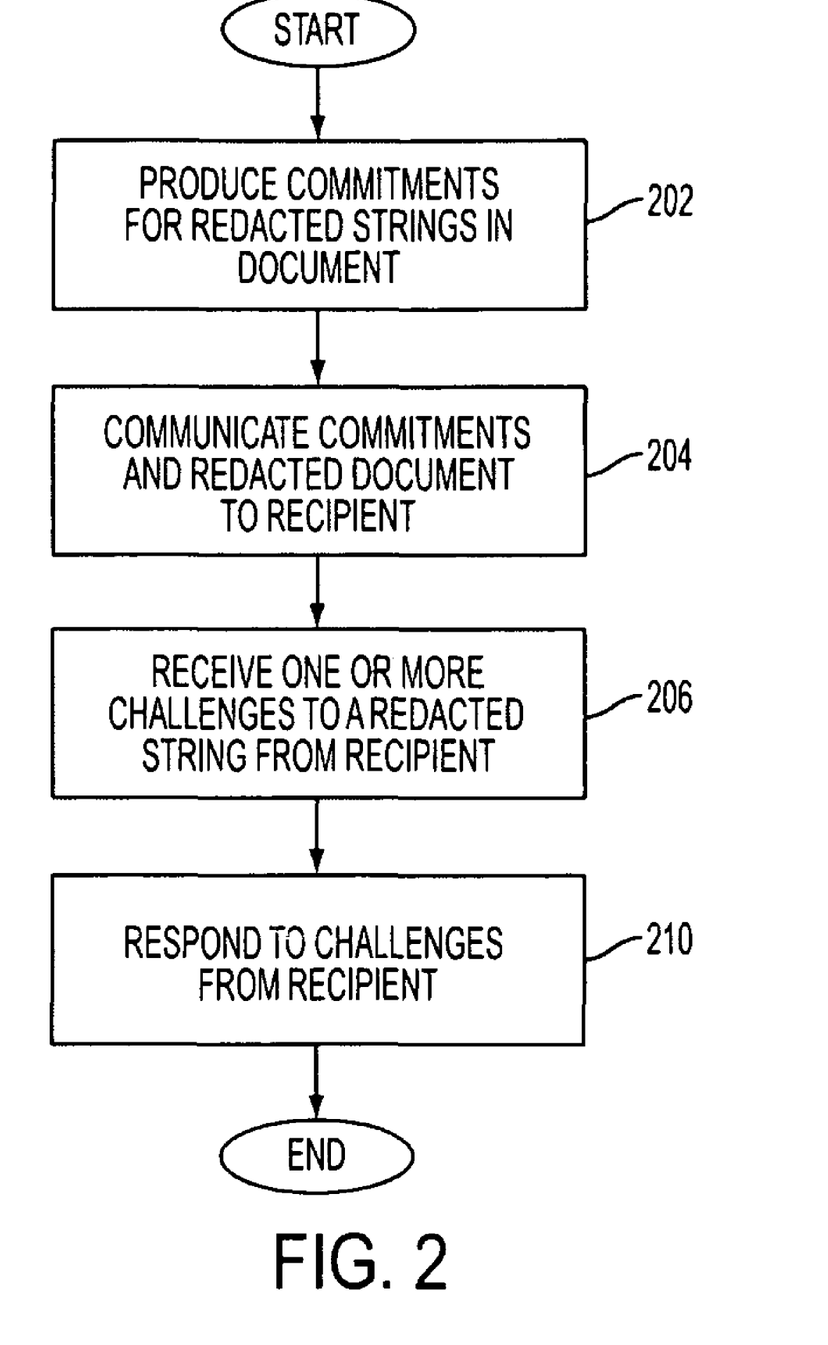
FIG. 2 presents a flowchart illustrating a process of redacting a document and responding to challenges from a recipient of the redacted document in accordance with an embodiment of the present invention.

FIG. 2 presents a flowchart illustrating a process of redacting a document and responding to challenges from a recipient of the redacted document in accordance with an embodiment of the present invention. To start, the document owner's system first produces commitments for strings that are redacted in a document (operation 202). The system then communicates the redacted document and these commitments to a recipient (operation 204).

Next, the system receives one or more challenges to a redacted string from a recipient (operation 206). In one embodiment of the present invention, the recipient expands a topic T into a number of topic strings $S_T$ by reference. The recipient then generates the challenges from these topic strings against the redacted string to make sure that the redacted string is not one of these topic strings.

Finally, the system responds to the challenges from the recipient (operation 210). Based on these responses, the recipient can ensure the appropriateness of the redaction.

Figure 3:
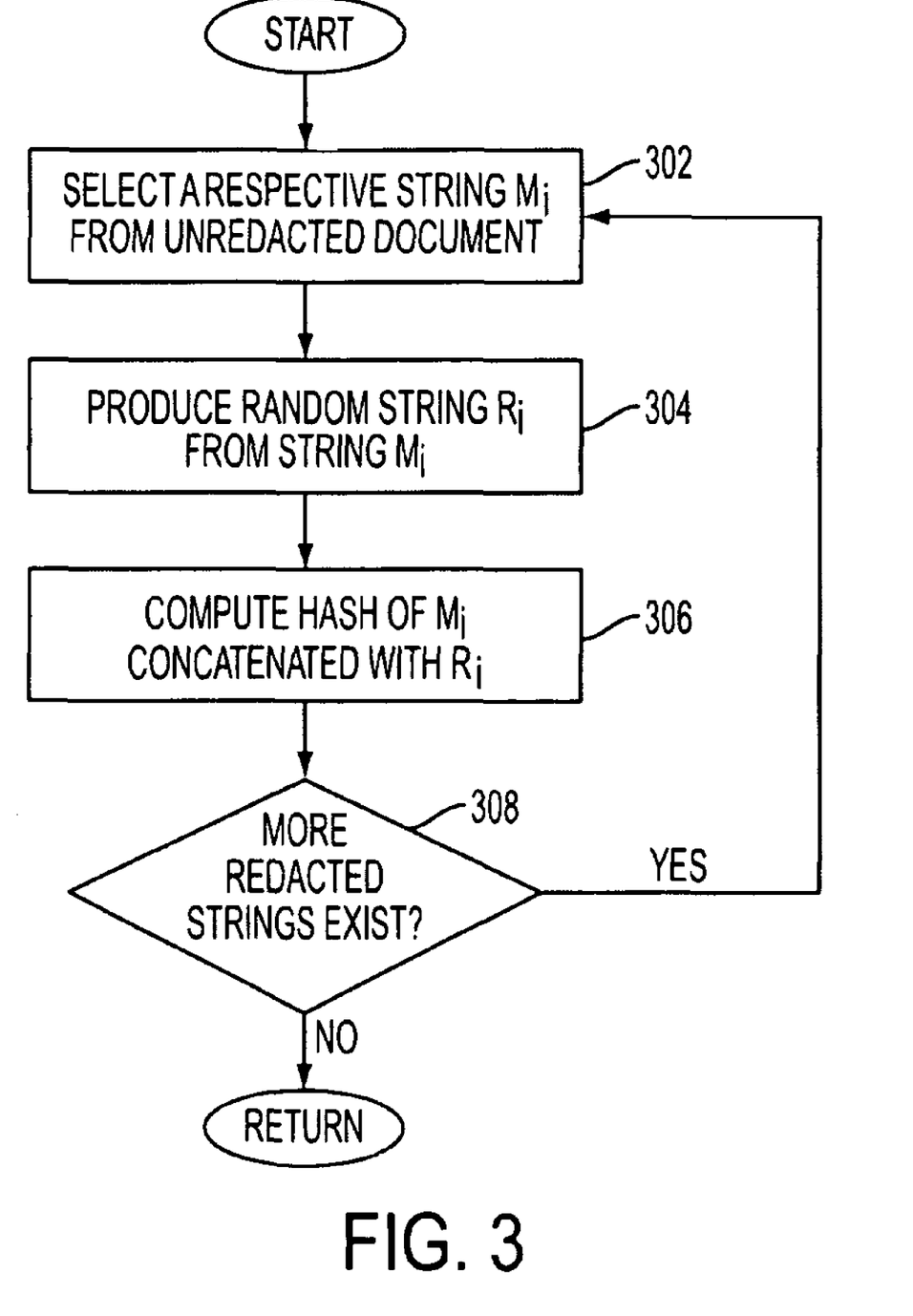
FIG. 3 presents a flowchart illustrating a process of producing commitments to strings in a document in accordance with an embodiment of the present invention.

FIG. 3 presents a flowchart illustrating a process of producing commitments for redacted strings in a document, which expands upon operation 202 of FIG. 2, in accordance with an embodiment of the present invention. Initially, the system selects a string $M_i$ of an unredacted document, where i denotes the index of the string (operation 302). The system then produces string $R_i$ from string $M_i$ (operation 304) by applying a trapdoor one-way function in the reverse direction to the string concatenation $(M_i\|i)$ based on a secret key K, wherein $R_i = f_K^{-1}(M_i\|i)$. A trapdoor one-way function is a one-way function with a secret trapdoor in the reverse direction. It is easy to compute the function in the forward direction, and hard to compute in the reverse direction unless secret key K is known. Here, the document owner's system owns the secret key K, and therefore can compute $R_i = f_K^{-1}(M_i\|i)$. For a system that does not have secret key K, it can only compute the function in the forward direction (i.e., $f_K$).

As will be explained in later sections, string $R_i$ is used to ensure that a commitment is hiding. The string $M_i$ is concatenated with i to effectively produce a unique string $M_i\|i$ which ensures the string $R_i$ associated with $M_i$ is unique and different from string $R_{i|n}$ associated with $M_{i|n}$ when $M_i = M_{i|n}$. Furthermore, the use of a trapdoor one-way function allows the commitment to be testable. In one embodiment, the document owner's system can use a public-key private-key mechanism. In this embodiment, the document owner's system creates a public/private key pair, it keeps the private key K, and publishes the public key K' to the recipient. Using this mechanism, the recipient can compute $M_i$ from $R_i$ using the public key K' (and thereby verify $R_i$ as being generated from string $M_i$). In embodiments of the present invention, the document owner can change the public/private key pair at any time. Variations of these embodiments allow the document owner to use a different public/private key pair for different subpoenas, different documents, or even different sections of the same document.

Next, the system computes a hash of $M_i$ concatenated with $R_i$ (operation 306) to produce the commitment $C_i = C(M_i\|i, R_i)$ for $M_i$. Note that by using $R_i$ as randomness to compute the commitment to $M_i$, the system can effectively prevent the commitment from being cracked by some brute-force, dictionary-based cracking method. This feature is important because most redacted strings include words that can be found in a dictionary. Also, note that concatenating the string $M_i$ with i effectively produces a unique string $M_i\|i$ which ensures a commitment for $M_i$ is unique from a commitment for $M_{i+n}$ when $M_i = M_{i+n}$. In one embodiment of the present invention, a message encoding mechanism concatenates $M_i$ with i in a way that ensures unambiguous de-concatenation. In one variation of this embodiment, the message encoding mechanism ensures that all string values for i have a predetermined character length. This uniqueness of string $M_i\|i$ can safeguard against a recipient deducing the content of a redacted string by comparing the corresponding commitment to another commitment of an unredacted text region with the same string data if the document owner also provides commitments of unredacted text to the recipient.

If more redacted strings without a corresponding commitment exist (operation 308), the system returns to operation 302 to produce another commitment. Note that, in one embodiment, the document owner can optionally generate commitments for all the strings in the document at once, then choose the strings to be redacted. The document owner's system can then communicate both the redacted document and the commitments for all the strings (redacted and unredacted) to the recipient, thereby allowing the recipient to validate the unredacted strings as well as challenge the redacted strings.

Figure 4:
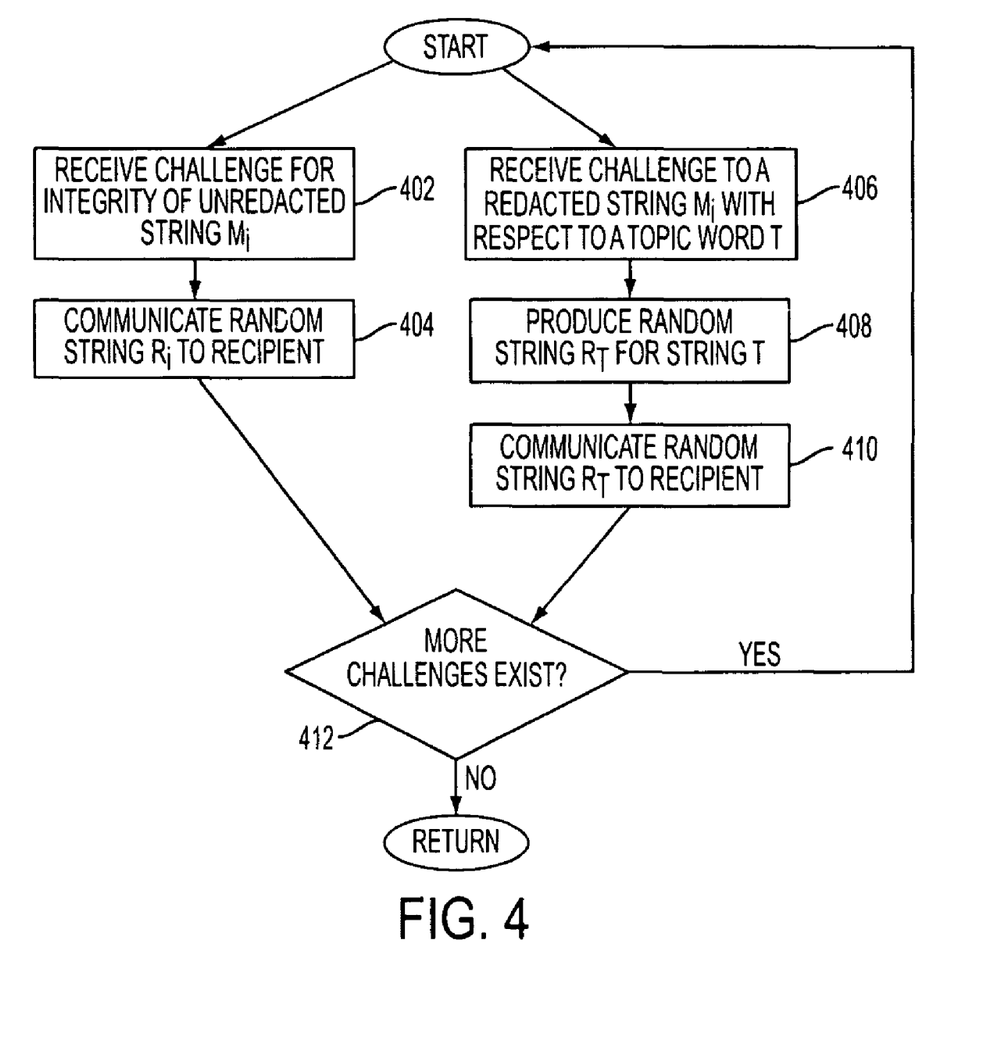
FIG. 4 presents a flowchart illustrating a process of responding to challenges from a recipient of a redacted document in accordance with an embodiment of the present invention.

FIG. 4 presents a flowchart illustrating a process of responding to challenges from a recipient of a redacted document, which expands upon operation 210 of FIG. 2, in accordance with an embodiment of the present invention. The system can either receive a challenge on the integrity of an unredacted string, or receive a challenge to a redacted string with respect to a topic string T.

When the system receives a challenge on the integrity of an unredacted string $M_i$ (operation 402), the system communicates the corresponding string $R_i$ to the recipient (operation 404). By doing so, the system allows the recipient to verify that $R_i$ is indeed produced from the string $M_i$. Note that the recipient can readily verify that $R_i$ is computed from $M_i$ by applying the one-way trapdoor function in the forward direction. After verifying $R_i$, the recipient can then compute the commitment for string $M_i$ using string $R_i$ as randomness. In one embodiment of the present invention, the system computes the commitment for string $M_i$ by producing a hash of $(M_i\|R_i)$. Then the recipient can compare the computed commitment with the received commitment to verify that string $M_i$ has not been tampered with.

When the system receives a challenge to a redacted string $M_i$ with respect to a topic string T (operation 406), the system produces a string $R_T$ for topic string T by applying the one-way trapdoor function in the reverse direction to the concatenation $(T\|i)$ $(R_T = f_K^{-1}(T\|i))$ (operation 408). The system then communicates the string $R_T$ to the recipient (operation 410). By doing so, the document owner's system allows the recipient to verify that $R_T$ is created by the document owner's system for topic string T. The recipient can then compute a commitment for topic string T which can be compared to the commitment received from the document owner for the redacted string $M_i$.

If more challenges exist (operation 412), the system proceeds to respond to another challenge.

Document Recipient

Figure 5:
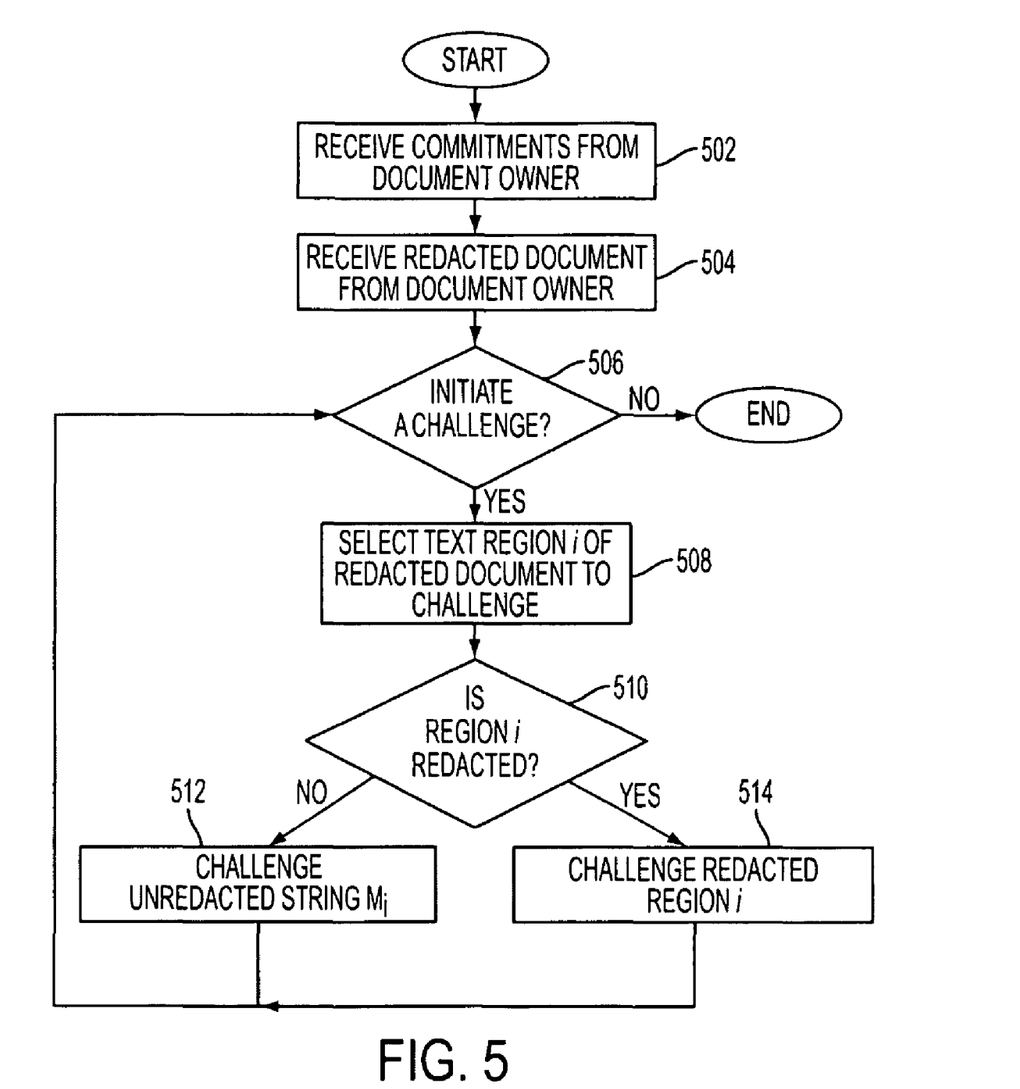
FIG. 5 presents a flowchart illustrating a process of receiving a redacted document and initiating a number of challenges to the redacted document in accordance with an embodiment of the present invention.

FIG. 5 presents a flowchart illustrating a process of receiving a redacted document and initiating a number of challenges to the redacted document in accordance with an embodiment of the present invention. First, the system receives a collection of commitments from the document owner (operation 502). These commitments correspond to a number of strings in the document. Note that the commitments can correspond to both redacted and unredacted strings. Then, the system receives the redacted document from the document owner (operation 504), wherein a number of text regions from the document have been redacted.

Next, the recipient decides whether to initiate a challenge (operation 506). If the recipient does not wish to challenge the integrity of a text region in the redacted document, the process terminates. Otherwise, the recipient selects a text region i of the redacted document to challenge (operation 508). Note that text region i can be a redacted text region, or a string which has not been redacted. The system then determines whether the text region i has been redacted (operation 510). If the text region i has not been redacted, the system challenges the unredacted string $M_i$ to verify that it has not been modified (operation 512). Otherwise, the system challenges the redacted region i to verify that it does not correspond to a topic string T which is provided by the recipient (operation 514).

Finally, the system returns to operation 506 to allow the recipient to decide whether to initiate another challenge.

Figure 6:
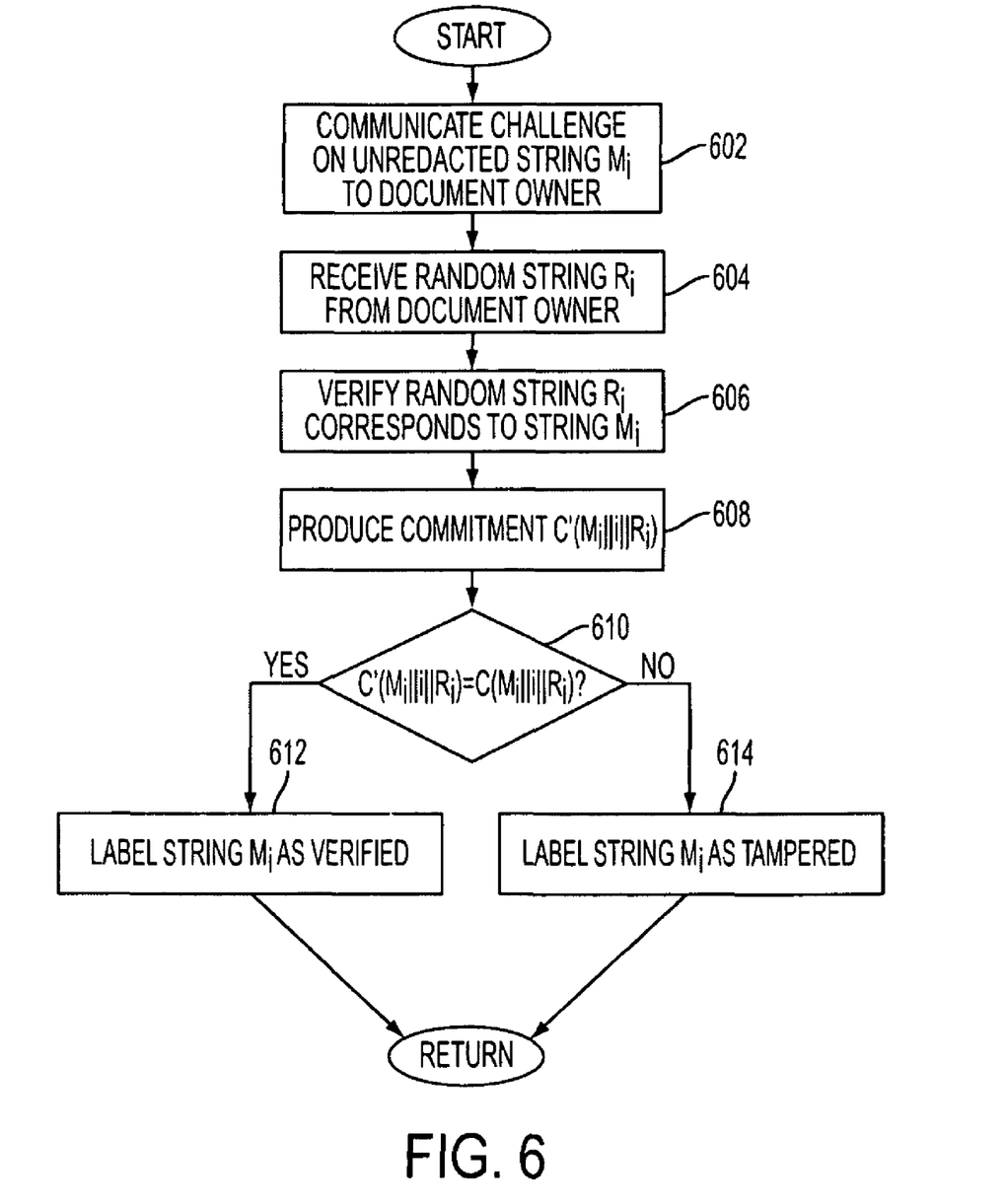
FIG. 6 presents a flowchart illustrating a process of challenging an unredacted string $M_i$ in accordance with an embodiment of the present invention.

FIG. 6 presents a flowchart illustrating a process of challenging an unredacted string $M_i$, which expands upon operation 512 of FIG. 5, in accordance with an embodiment of the present invention. The system first communicates the challenge on the unredacted string $M_i$ to the document owner (operation 602). In response to this challenge, the system receives a string $R_i$ from the document owner (operation 604). Note that, in normal operation, the string $R_i$ ($R_i = f_K^{-1}(M_i\|i)$) was created by the document owner when producing a commitment to the unredacted string $M_i$. Next, the system verifies that the string $R_i$ corresponds to the string concatenation $(M_i\|i)$ by applying a trapdoor one-way function $f_K$ in the forward direction to string $R_i$ based on a public key K', i.e., $M_i\|i = f_K(R_i)$ (operation 606). Verifying that the string $R_i$ corresponds to string $M_i$ allows the system to ensure the document owner is not providing an arbitrary string $R_i'$ which can result in a fraudulent challenge outcome.

The system then uses the string $R_i$ as randomness to produce a cryptographic commitment $C'(M_i\|i, R_i)$ (operation 608). The system determines whether the commitment $C'(M_i\|i, R_i)$ is identical to the original commitment $C(M_i\|i, R_i)$ which was previously received from the document owner (see operation 502 of FIG. 5) (operation 610). If so, the system labels string $M_i$ as verified (operation 612). Otherwise, if the two commitments are not identical, then the system has identified that string $M_i$ has been tampered with, and the system labels string $M_i$ as tampered (operation 614).

Figure 7:
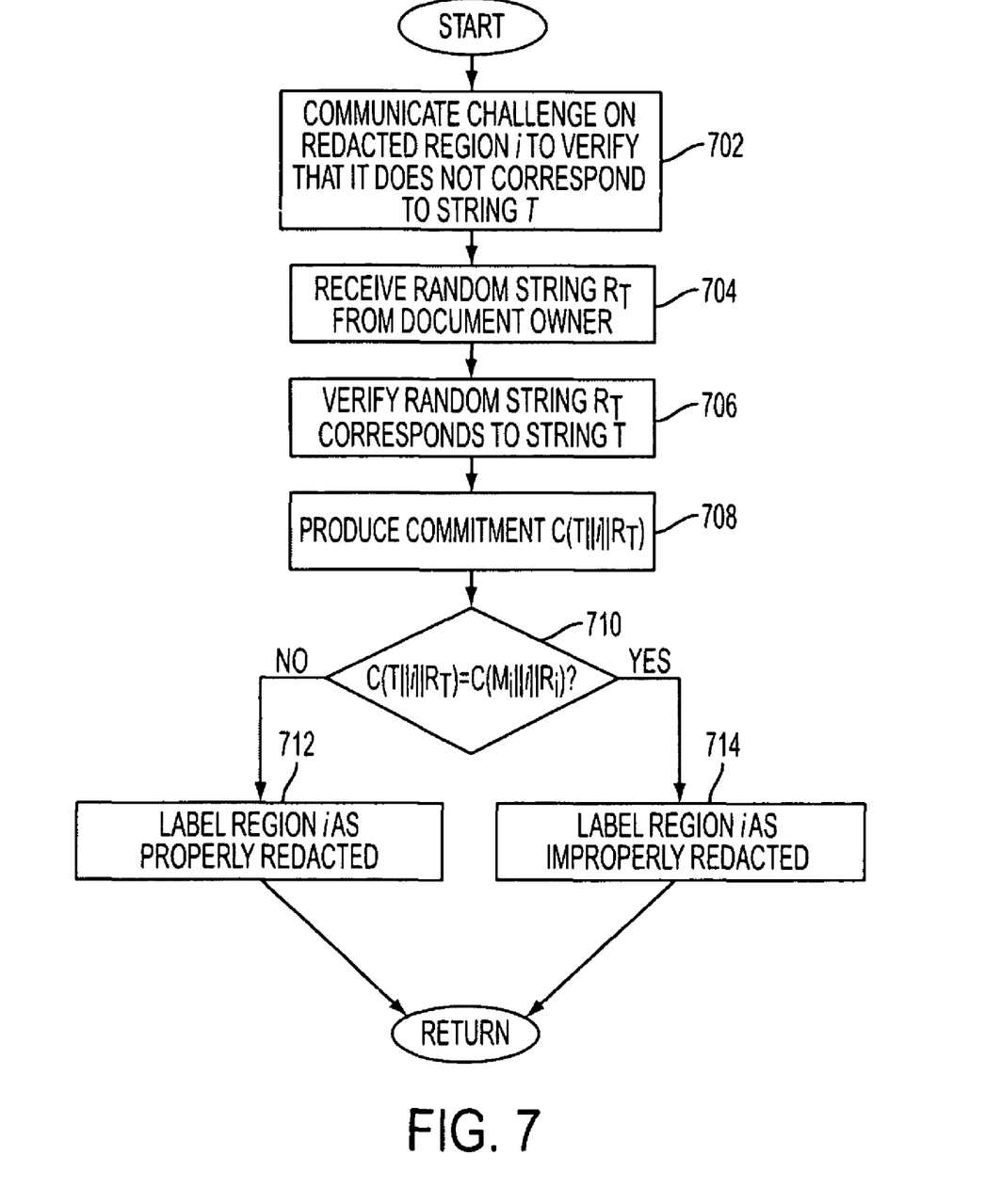
FIG. 7 presents a flowchart illustrating a process of challenging a redacted region i in accordance with an embodiment of the present invention.

FIG. 7 presents a flowchart illustrating a process of challenging a redacted region i, which expands upon operation 514 of FIG. 5, in accordance with an embodiment of the present invention. The system first communicates the challenge on redacted region i and topic string T to the document owner's system to verify that redacted region i does not correspond to string T (operation 702). In response to this challenge, the system receives a string $R_T$ from the document owner (operation 704). During normal operation, string $R_T$ corresponds to the topic string T, which the recipient does not expect to be included in the redacted document. Note that the document owner's system generates $R_T$ by applying the one-way trapdoor function in the reverse direction to the concatenation $(T\|i)$ using a private key (i.e., $R_T = f_K^{-1}(T\|i)$). Next, the system verifies whether string $R_T$ corresponds to the string concatenation $(T\|i)$ (operation 706) by applying the trapdoor one-way function $f_K$ in the forward direction to string $R_T$ based on a public key K' (i.e., $T = f_K(R_T)$). Verifying that the string $R_T$ corresponds to the string concatenation $(T\|i)$ allows the system to ensure that the document owner does not provide an arbitrary string $R_T'$ to cause a fraudulent challenge outcome.

The system then uses the string $R_T$ as randomness to produce a corresponding commitment $C'(T\|i, R_T)$ (operation 708). The system further compares the computed commitment to the original commitment $C(M_i\|i, R_i)$ which was received from the document owner (see operation 502 of FIG. 5) (operation 710). If the two commitments are not identical, the system verifies that the redacted text region i is not the same as topic string T, and labels the text region i as being properly redacted (operation 712). Otherwise, if the two commitments are identical, then the system has determined that the redacted text region i corresponds to the topic string T, and labels the text region i as being improperly redacted (operation 714).

In one embodiment, the recipient's system can generate a list of topic strings pertaining to a given topic by inference. For example, the system can issue a keyword search to a corpus (such as the web) using a known topic word. The system can then analyze the search results and extract a number of words or phrases pertaining to the same topic. In one embodiment, the system uses a variety of text-mining techniques, such as computing term-frequency inverse-document-frequency (TF-IDF) scores for the terms in the search results, to generate the list of topic strings.

Computer System

Figure 8:
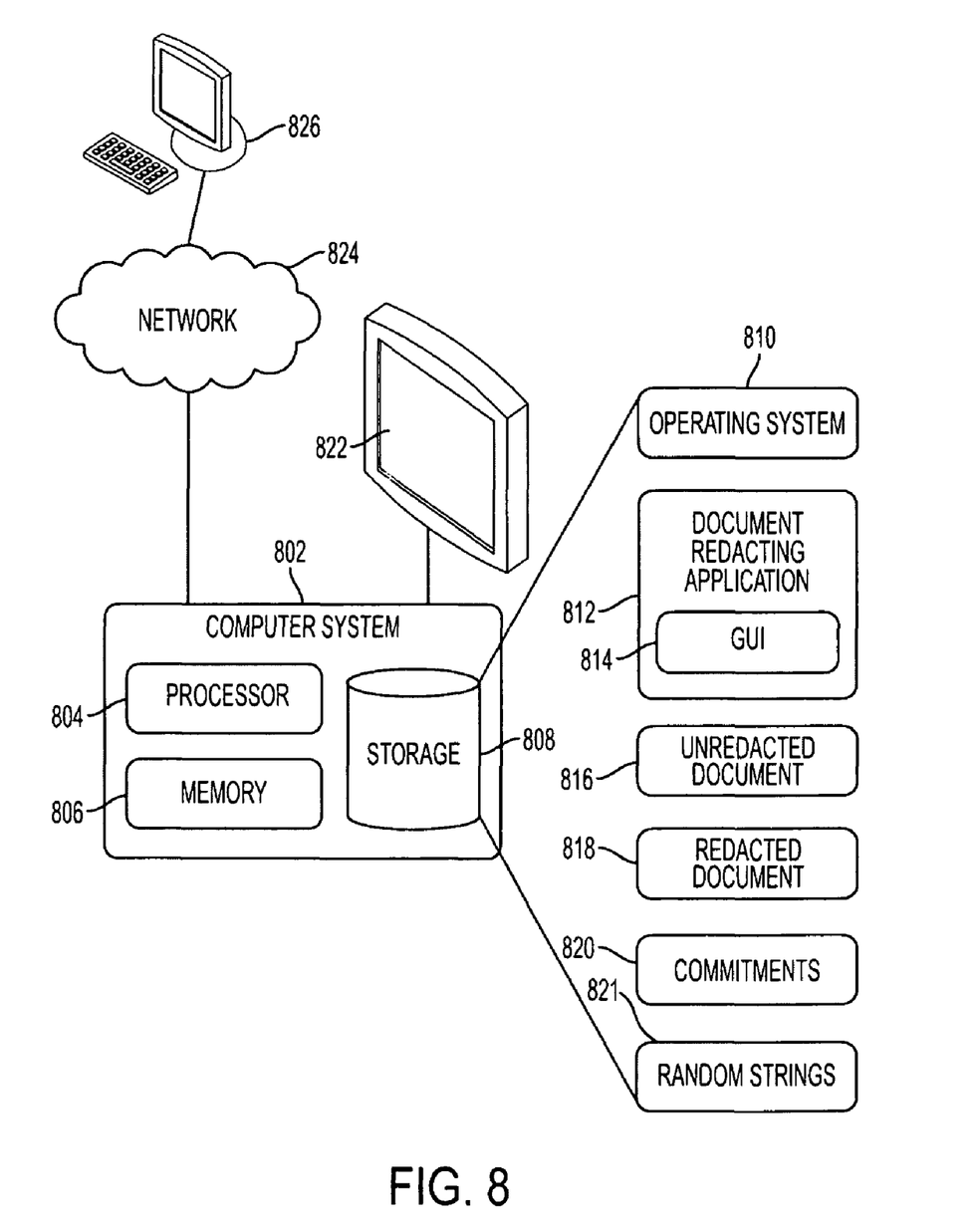
FIG. 8 illustrates a computer system that facilitates verifying the integrity of redacted documents in accordance with one embodiment of the present invention.

FIG. 8 illustrates a computer system that facilitates verifying the integrity of redacted documents in accordance with one embodiment of the present invention. A computer system 802 includes a processor 804, a memory 806, and a storage device 808. Computer system 802 is also coupled to a network 824 and a display device 822. In one embodiment, network 824 includes the Internet. Storage device 808 stores an operating system 810, a document redacting application 812, and an unredacted document 816. Document redacting application 812 includes a GUI module 814, and produces a redacted document 818 and a number of commitments 820 which can also be stored in storage 808. Also coupled to network 824 is a client 826, which in one embodiment is a recipient of redacted document 818 and commitments 820.

During operation, document redacting application 812 is loaded from storage device 808 into memory 806 and executed by processor 804. Document redacting application 812 allows a document owner to select text regions to redact from unredacted document 816, generates a redacted document 818, and produces commitments 820 for the redacted text regions. Computer system 802 then communicates redacted document 818 and commitments 820 to client 826 through network 824. When computer system 802 receives a challenge from client 826, which challenges the integrity of redacted document 818, document redacting application 812 produces strings 821 which can be used by client 826 to perform the challenge, and computer system 802 communicates strings 821 to client 826 through network 824.

In some embodiments, client 826 can challenge a redaction of a text region in redacted document 818. In doing so, client 826 communicates a topic word to computer system 802 through network 824. Then, client 826 receives a commitment 820 and a string 821 from computer system 802 which correspond to the challenge. Client 826 verifies the integrity of string 821 and produces locally a commitment corresponding to the challenge and compares the produced commitment with commitment 820 to determine whether the redacted text region contains the topic word.

In some embodiments, client 826 can challenge the integrity of an unredacted text region in redacted document 818. In doing so, client 826 communicates the text location in redacted document 818 to computer system 802 through network 824. Then, client 826 receives a commitment 820 and a string 821 from computer system 802 which correspond to the challenge. Client 826 verifies the integrity of string 821 and produces locally a commitment corresponding to the challenge and compares the produced commitment with commitment 820 to determine whether the text region has been tampered with.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field programmable gate arrays (FPGAs), and other programmable-logic devices now known or later developed. When the hardware modules are activated, the hardware modules perform the methods and processes included within the hardware modules.

What is claimed is:

1. A method for redacting content from a document and allowing a recipient to challenge the appropriateness of the redaction, the method comprising:
   redacting a string $M_i$ from a text location i in the document;
   producing a string $R_i$ from string $M_i$ by applying a trapdoor one-way function in the reverse direction, $f_K^{-1}$, based on a secret key K, wherein the input to the trapdoor one-way function in the reverse direction is at least based on $M_i$;
   producing a commitment $C_i = C(M_i, R_i)$ for string $M_i$ using string $R_i$ as randomness;
   communicating the commitment $C_i$ to the recipient;
   receiving a challenge to the redacted string $M_i$ from the recipient, wherein the challenge indicates a topic string T;
   producing, by a computing device, a string $R_T$ from the topic string T by applying the trapdoor one-way function in the reverse direction, $f_K^{-1}$, based on the secret key K, wherein the input to the trapdoor one-way function in the reverse direction is at least based on T; and
   communicating string $R_T$ to the recipient, thereby allowing the recipient to determine whether the commitment $C_i$ corresponds to topic string T.

2. The method of claim 1, further allowing the recipient to verify that the received string $R_T$ corresponds to string T by applying the trapdoor one-way function in the forward direction, $f_{K'}$, to string T based on a public key K' that corresponds to the private key K, wherein $T = f_{K'}(R_T)$.

3. The method of claim 1, wherein producing the string $R_i$ and producing the commitment $C_i$ further comprises first modifying the string $M_i$ so the string $M_i$ is unique from other strings in the document.

4. The method of claim 3, wherein modifying the string $M_i$ comprises concatenating $M_i$ with the value i to produce $R_i = f_K^{-1}(M_i \| i)$ and to produce $C_i = C(M_i \| i, R_i)$.

5. The method of claim 1, wherein producing the string $R_i$ further comprises first modifying the string $M_i$ to produce a value derived from string $M_i$.

6. The method of claim 1, further comprising:
   producing a string $R_j$ from an unredacted string $N_j$ at a text location j in the document by applying the trapdoor one-way function, $f_K$, in the reverse direction to string $N_j$ based on the secret key K, wherein $R_j = f_K^{-1}(N_j)$;
   producing a commitment $C_j = C(N_j, R_j)$ for string $N_j$ using string $R_j$ as randomness;
   communicating commitment $C_j$ to the recipient;
   communicating string $N_j$ to the recipient;
   receiving a challenge for the integrity of string $N_j$ from the recipient; and
   communicating string $R_j$ to the recipient as a response to the challenge, thereby allowing the recipient to:
      produce a commitment $C_j' = C(N_j, R_j)$ for string $N_j$ using string $R_j$ as randomness; and
      compare commitment $C_j'$ with $C_j$, thereby determining whether string $N_j$ has been tampered with.

7. The method of claim 6, wherein the recipient verifies that the received string $R_j$ corresponds to string $N_j$ by applying the trapdoor one-way function in the forward direction, $f_{K'}$, to string $R_j$ based on the public key K' that corresponds to the private key K, wherein $N_j = f_{K'}(R_j)$.

8. The method of claim 1, wherein communicating the commitment to the recipient comprises using a Merkle hash tree to compress a plurality of commitments into a single commitment.

9. A non-transitory computer-readable storage medium storing instructions that when executed by a computer cause the computer to perform a method for redacting content from a document and allowing a recipient to challenge the appropriateness of the redaction, the method comprising:
   redacting a string $M_i$ from location i in the document;
   producing a string $R_i$ from string $M_i$ by applying a trapdoor one-way function in the reverse direction, $f_K^{-1}$, based on a secret key K, wherein the input to the trapdoor one-way function in the reverse direction is at least based on $M_i$;
   producing a commitment $C_i = C(M_i, R_i)$ for string $M_i$ using string $R_i$ as randomness;
   communicating the commitment $C_i$ to the recipient;
   receiving a challenge to the redacted string $M_i$ from the recipient, wherein the challenge indicates a topic string T;

producing a string $R_T$ from the topic string T by applying the trapdoor one-way function in the reverse direction, $f_K^{-1}$, based on the secret key K, wherein the input to the trapdoor one-way function in the reverse direction is at least based on T; and communicating string $R_T$ to the recipient, thereby allowing the recipient to determine whether the commitment $C_i$ corresponds to topic string T.

10. The computer-readable storage medium of claim 9, further allowing the recipient to verify that the received string $R_T$ corresponds to string T by applying the trapdoor one-way function in the forward direction, $f_{K'}$, to string T based on a public key K' that corresponds to the private key K, wherein $T=f_{K'}(R_T)$.

11. The computer-readable storage medium of claim 9, wherein producing the string $R_i$ and producing the commitment $C_i$ further comprises first modifying the string $M_i$ so the string $M_i$ is unique from other strings in the document.

12. The computer-readable storage medium of claim 11, wherein modifying the string $M_i$ comprises concatenating $M_i$ with the value i to produce $R_i=f_K^{-1}(M_i\|i)$ and to produce $C_i=C(M_i\|i, R_i)$.

13. The computer readable storage mechanism of claim 9, wherein producing the string $R_i$ further comprises first modifying the string $M_i$ to produce a value derived from string $M_i$.

14. The computer-readable storage medium of claim 9, further comprising:
producing a string $R_j$ from an unredacted string $N_j$ at a text location j in the document by applying the trapdoor one-way function, $f_K$, in the reverse direction to string $N_j$ based on the secret key K, wherein $R_j=f_K^{-1}(N_j)$;
producing a commitment $C_j=C(N_j, R_j)$ for string $N_j$ using string $R_j$ as randomness;
communicating commitment $C_j$ to the recipient;
communicating string $N_j$ to the recipient;
receiving a challenge for the integrity of string $N_j$ from the recipient; and
communicating string $R_j$ to the recipient as a response to the challenge, thereby allowing the recipient to:
produce a commitment $C_j'=C(N_j, R_j)$ for string $N_j$ using string $R_j$ as randomness; and
compare commitment $C_j'$ with $C_j$, thereby determining whether string $N_j$ has been tampered with.

15. The computer-readable storage medium of claim 14, wherein the recipient verifies that the received string $R_j$ corresponds to string $N_j$ by applying the trapdoor one-way function in the forward direction, $f_{K'}$, to string $R_j$ based on the public key K' that corresponds to the private key K, wherein $N_j=f_{K'(Rj)}$.

16. The computer-readable storage medium of claim 9, wherein communicating the commitment to the recipient comprises using a Merkle hash tree to compress a plurality of commitments into a single commitment.

17. An apparatus for redacting content from a document and allowing a recipient to challenge the appropriateness of the redaction, comprising:
a redaction utility configured to accept a request from the document owner for redacting a string $M_i$ from location i in the document;
a string generator configured to produce a string $R_i$ from string $M_i$ by applying a trapdoor one-way function in the reverse direction, $f_K^{-1}$, based on a secret key K, wherein the input to the trapdoor one-way function in the reverse direction is at least based on $M_i$;

a commitment generator configured to produce a commitment $C_i=C(M_i,R_i)$ for string $M_i$ using string $R_i$ as randomness; and
a communication mechanism configured to:
communicate the commitment $C_i$ to the recipient;
receive a challenge to the redacted string $M_i$ from the recipient,
wherein the challenge indicates a topic string T,
wherein receiving the topic string T from the recipient causes the string generator to produce a string $R_T$ from the topic string T by applying the trapdoor one-way function in the reverse direction, $f_K^{-1}$, based on the secret key K, wherein the input to the trapdoor one-way function in the reverse direction is at least based on T; and
communicate string $R_T$ to the recipient;
wherein communicating string $R_T$ to the recipient allows the recipient to determine whether the commitment $C_i$ corresponds to topic string T.

18. The apparatus of claim 17, wherein the recipient verifies that the received string $R_j$ corresponds to string $N_j$ by applying the trapdoor one-way function in the forward direction, $f_{K'}$, to string $R_j$ based on the public key K' that corresponds to the private key K, wherein $N_j=f_{K'}(R_j)$.

19. The apparatus of claim 17, wherein producing the string $R_i$ and producing the commitment $C_i$ further comprises first modifying the string $M_i$ so the string $M_i$ is unique from other strings in the document.

20. The apparatus of claim 19, wherein modifying the string $M_i$ comprises concatenating $M_i$ with the value i to produce $R_i=f_K^{-1}(M_i\|i)$ and to produce $C_i=C(M_i\|i, R_i)$.

21. The apparatus of claim 17, wherein producing the string $R_i$ further comprises first modifying the string $M_i$ to produce a value derived from string $M_i$.

22. The apparatus of claim 17, wherein the commitment generator is further configured to produce, for an unredacted string $N_j$ at a text location j in the document, a commitment $C_j=C(N_j, R_j)$ using a string $R_j$ produced from string $N_j$;
wherein the string generator produces string $R_j$ by applying the trapdoor one-way function in the reverse direction, $f_K$, to string $N_j$ based on the secret key K, wherein $R_j=f_K^{-1}(M_j)$;
wherein the communication mechanism is further configured to:
communicate the commitment $C_j$ to the recipient;
communicate string $N_j$ to the recipient;
receive a challenge for the integrity of string $N_j$ from the recipient; and communicate string $R_j$ to the recipient as a response to the challenge; and
wherein communicating string $R_j$ to the recipient allows the recipient to:
produce a commitment $C_j'=C(N_j, R_j)$ for string $N_j$ using string $R_j$ as randomness; and
compare commitment $C_j'$ with $C_j$, thereby determining whether string $N_j$ has been tampered with.

23. The apparatus of claim 22, wherein the recipient verifies that the received string $R_j$ corresponds to string $N_j$ by applying the trapdoor one-way function in the forward direction, $f_{K'}$, to string $R_j$ based on the public key K' that corresponds to the private key K, wherein $N_j=f_{K'}(R_j)$.

24. The apparatus of claim 17, wherein communicating the commitment to the recipient comprises using a Merkle hash tree to compress a plurality of commitments into a single commitment.

* * * * *